United States Patent [19]

Adlhart

[11] 4,261,956
[45] Apr. 14, 1981

[54] CARTRIDGE FOR GAS GENERATOR

[75] Inventor: Otto J. Adlhart, Newark, N.J.

[73] Assignee: Engelhard Minerals & Chemicals Corporation, Iselin, N.J.

[21] Appl. No.: 48,309

[22] Filed: Jun. 13, 1979

[51] Int. Cl.³ ............................................... B01J 7/02
[52] U.S. Cl. ................................... 422/239; 206/446; 206/523; 422/129; 422/236; 422/238; 422/305
[58] Field of Search ............... 422/120, 129, 236, 238, 422/239, 305, 197; 48/61, 4(U.S. only); 429/17, 19; 423/657; 128/202.26, 204.17, 205.12; 206/443, 446, 523; 220/85 B

[56] References Cited

U.S. PATENT DOCUMENTS

| | | | |
|---|---|---|---|
| 2,334,211 | 11/1943 | Miller | 422/129 X |
| 2,455,975 | 12/1948 | Buehl et al. | 422/239 |
| 2,642,693 | 6/1953 | Broady | 422/239 X |
| 2,855,355 | 10/1958 | Ohlinger et al. | 206/446 |
| 2,912,138 | 11/1959 | Bishop | 220/85 B |
| 3,372,996 | 3/1968 | Barrett | 422/236 X |
| 3,534,884 | 10/1970 | Suter | 220/85 B |
| 3,649,360 | 3/1972 | Bloomfield et al. | 429/19 |

*Primary Examiner*—Joseph Scovronek

[57] ABSTRACT

A cartridge for a gas generator of the type in which a liquid such as water is reacted with a solid fuel such as a base metal hydride comprises a canister which contains at least one compressible filler means which cooperates with the canister interior to define a fuel charge compartment. The canister has a plurality of fluid flow passages formed in it to place the fuel charge compartment in fluid flow communication with the exterior of the canister. Preferably, a pair of compressible filler means such as blocks of a synthetic polymeric foamed material are placed within the canister to define the fuel charge compartment between them. The fluid flow passages communicate with the fuel compartment so that upon immersion of the cartridge into a liquid the liquid flows through the passages to contact the fuel and react with it to form a gas. Fuels of this type expand upon such reaction and the compressible filler means are compressed by the expanding fuel to accommodate their increased volume sufficiently to prevent undue compression of the fuel to an extent which would unduly retard the penetration of the liquid into the body of the fuel charge. The canister is preferably lined with a fluid permeable material such as a fibrous paper to promote even distribution of the liquid about the fuel charge.

15 Claims, 4 Drawing Figures

CARTRIDGE FOR GAS GENERATOR

BACKGROUND OF THE INVENTION

The present invention concerns gas generators and, more particularly, concerns gas generators of the type in which a solid fuel is contacted with a liquid with which it reacts chemically to generate the desired gas. Such gas generators find employment in any situation where it is desired to have a relatively light weight, easily transportable and replaceable cartridge-type arrangement utilized as the source of a gas to avoid the obvious difficulties attendant upon such storage and use of compressed gas within a pressurized vessel.

A common type of such gas generator is one in which the solid fuel charge is a metal hydride such as, for example, a base metal hydride which reacts vigorously with water to generate hydrogen gas and leave a solid residue of a base metal hydroxide.

There are a number of difficulties associated with such devices. Among these difficulties is the fact that upon reaction with the liquid, usually water, such fuels tend to expand in volume. Since the fuels are normally contained within an enclosed container, expansion of the reacted fuel compacts the material with the result that it becomes increasingly difficult for the reacting liquid to penetrate the fuel charge and consequently the reaction often subsides while there is still left a considerable amount of unreacted solid fuel. Another difficulty with prior art generators is the difficulty in handling and storage of the fuels because of their sensitivity to moisture. Yet another difficulty is disposal of the reacted or spent fuel after the cartridge charge is exhausted.

Gas generating cartridges of this type almost universally employ water as the reactant and therefore the invention will be described with reference to water as the reactant liquid although the utilization of other liquids is within the scope of the invention.

Gas generators employing cartridges of the type with which this present invention is concerned, normally employ a reservoir of water or provide a chamber into which water is supplied and brought into contact with the solid fuel.

The prior art has provided a number of embodiments of cartridge-type gas generators. For example, U.S. Pat. No. 2,463,863, (F. Gibadlo) provides a canister contained within an outer casing. The canister has a series of relatively large perforations in it to admit water into contact with the solid fuel contained within the canister and to permit the product calcium hydroxide to be flushed out of the holes in the bottom of the canister while the hydrogen passes upwardly. The canister is a rigid member closed at both its opposite ends and containing perforations in the lower portion thereof. Another embodiment is shown in U.S. Pat. No. 2,463,862, to the same inventor, in which the bottom of the canister is provided with a recessed portion which is perforated. Both these patents recognize a difficulty involved in utilizing a fuel such as calcium hydride (preferred by the patentee) in "that the calcium hydroxide formed by the reaction tends to flocculate and collect in the can, thus covering calcium hydride not yet reacted upon and retarding the generation of additional gas." (column 2, lines 5-9 of U.S. Pat. No. 2,463,863).

U.S. Pat. No. 2,334,211 (C. E. Miller) shows a gas generator of the type employing a cartridge which is telescoped within an outer container and is adapted to be moved outwardly thereof for use by immersing the entire device in sea water.

U.S. Pat. No. 3,174,833 (R. H. Blackmer) discloses a hydrogen generating canister adapted to be used to supply hydrogen gas to a fuel cell.

U.S. Pat. No. 3,820,956 (Titterington et al.) discloses a gas generator containing a solid fuel which is reacted by being brought into contact with a liquid reactant. In order to maintain the liquid reactant in contact with the as yet unreacted portion of the solid fuel, a spring loaded pressure plate having a perforating knife associated therewith is utilized to push the pressure plate and the knife in a direction along the liquid delivery tube so that the knife slits the tube thereby moving the effective exit of the reactant liquid axially along the fuel charge.

It is an object of the present invention to provide a cartridge for a gas generator of the type in which a liquid reactant reacts with a solid fuel contained within the cartridge to generate a gas, which is of relatively simple construction and overcomes certain problems associated with prior art gas generator cartridges. It is another object of the present invention to provide a cartridge for a gas generator of the type described which cartridge provides an expansible solid fuel charge compartment to accommodate expansion of the reacted fuel and which provides means for more uniform distribution of the liquid reactant along the solid fuel charge.

Other objects and advantages of the present invention will be apparent from the following description thereof.

SUMMARY OF THE INVENTION

In accordance with the present invention, there is provided a cartridge for a gas generator which comprises a canister having an interior defining an enclosed space. Compressible filler means is disposed within the enclosed space and cooperates with the interior of the canister to define a fuel charge compartment adapted to receive therein a solid fuel. The canister has fluid flow passages formed therein which serve to connect the fuel charge compartment in fluid flow communication with the exterior of the canister. The fuel utilized in the canister is one which, upon contact with a suitable liquid introduced through the fluid flow passages, reacts with the liquid to release a gas and expands in volume. The filler means is compressed by such expansion to enlarge the fuel charge compartment to accommodate the expansion of the fuel charge sufficiently to maintain a preselected rate of liquid penetration into the fuel charge.

In accordance with one aspect of the invention, a fluid permeable liner means lines at least a portion of the fuel charge compartment and overlies the fluid flow passages.

In accordance with another aspect of the invention, the liner means is a water and gas permeable fiber material and the filler means is a synthetic polymeric foamed material.

In one aspect of the invention, the cartridge contains a pair of spaced apart, compressible filler means and the solid fuel charge compartment is formed between the spaced apart compressible filler means.

In accordance with one aspect of the invention, the cartridge further includes a solid fuel charge contained within the fuel charge compartment. The solid fuel is preferably in particulate form and may be selected from borohydrides and hydrides and mixed hydrides of the elements of Groups I-III of the Periodic Table of the Elements and mixtures thereof.

BRIEF DESCRIPTION OF THE DRAWINGS

The invention will now be described with respect to a specific embodiment thereof as illustrated in the following drawings in which:

Referring now to FIG. 1, there is shown in schematic elevation view a Kipp generator generally indicated at 10 comprising a casing 12 having a water reservoir 14 supported therein at the upper portion thereof. Water reservoir 14 has a water fill inlet 16 which is suitably capped to provide means to conveniently fill water reservoir 14 as required. Supported within casing 12 in the lower portion thereof below water reservoir 14, is a hydrogen generator 18 which comprises a hydrogen reaction tank 20 within which are disposed, one above the other, a pair of cartridges 22, 22' comprising embodiments of the present invention. Each cartridge is disposed horizontally and its respective opposite ends are received within mounting recesses 24a, 24b and 24a', 24b' formed, respectively, in a pair of end mounting pads 26a, 26b secured, respectively, to opposite ends of reaction tank 20. Cartridges 22, 22' are slightly spaced apart one from the other so that the outer circumferential surface of each of cartridges 22, 22' is exposed within reaction tank 20. A water inlet pipe 28 connects the lower portion of water reservoir 14 to the lower portion of reaction tank 20 and serves to admit water from reservoir 14 to reaction tank 20, as required. A hydrogen gas outlet line 30 leads from the upper portion of reaction tank 20 to conduct from tank 20 hydrogen gas formed therein. Hydrogen gas outlet 30 may lead to a suitable receptacle for receiving or utilizing the hydrogen gas generator. For example, hydrogen gas outlet line 30 may lead to the hydrogen inlet manifold of a fuel cell which conveniently may also be enclosed within casing 12 to provide a unitary fuel cell and fuel source structure. When so employed, a suitable dryer and ammonia filter and/or other pretreatment devices may be incorporated into line 30 between reaction tank 20 and the hydrogen manifold inlet of the fuel cell.

Referring now to FIG. 2, there is shown in side view sectional elevation the cartridge 22 which is seen to have a canister (unnumbered) comprised of a circumferential substantially cylindrical shaped wall portion 32 and end walls 34, 34', one of which (34) is shown in partial view in the end elevation view of FIG. 2A. Wall portion 32 is closed at its opposite ends by end walls 34, 34' so that circumferential wall 32 and end walls 34, 34' are seen to cooperate to define an interior of said canister of cartridge 22, which is substantially cylindrical in shape. At least the central portion of circumferential wall 32 contains a number of fluid flow passages 46 which extend radially therethrough to place fuel charge compartment 40 into fluid flow communication with the exterior of cartridge 22. The perforations which comprise fluid flow passages 46 are seen to be spaced apart circumferentially around the canister of cartridge 22 and to be longitudinally spaced apart along the central portion of the canister of cartridge 22, which central portion forms fuel compartment 40 as described below.

Figure 1:
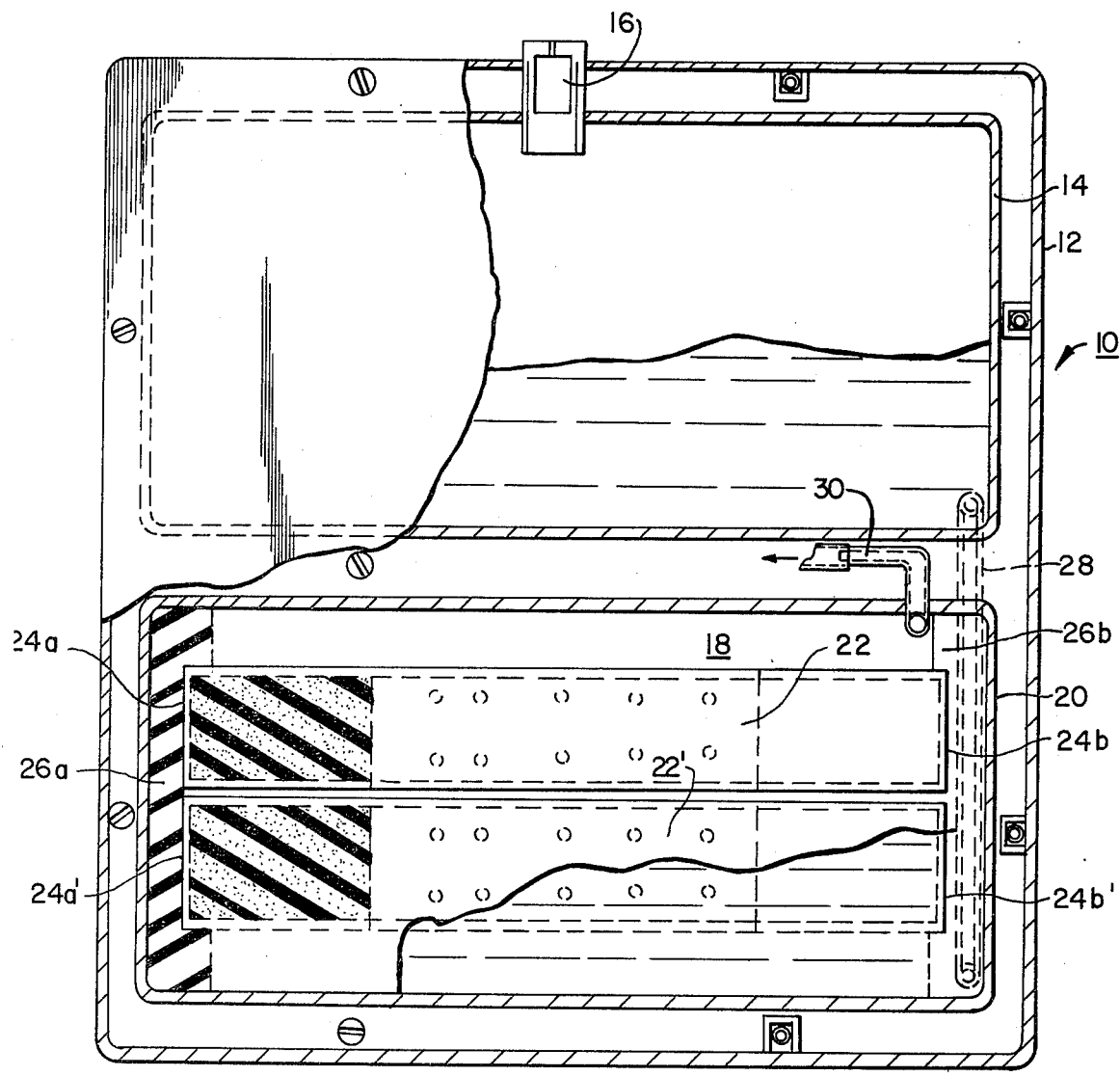
FIG. 1 is a schematic view in elevation of a Kipp type generator in which a pair of fuel cartridges (comprising an embodiment of the present invention) are contained within a vessel adapted to contain water supplied from a water reservoir.
Figure 2:
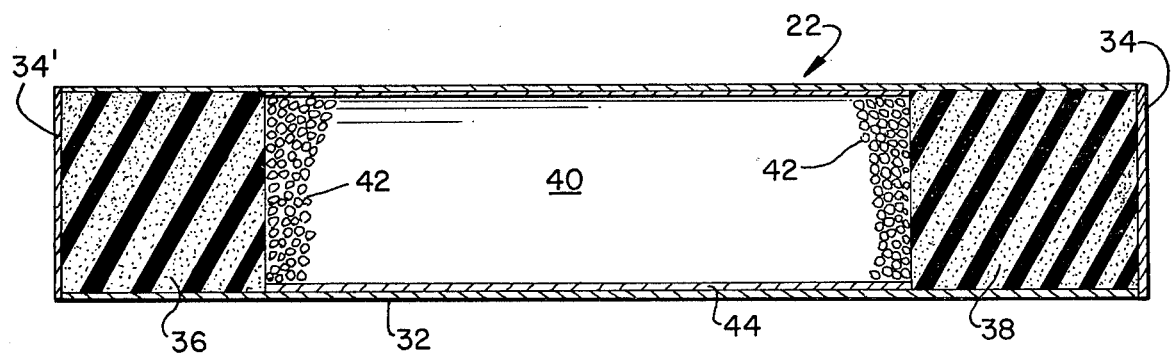
FIG. 2 is a side view in partial section of one embodiment of a cartridge in accordance with the present invention, prior to reaction of its fuel charge.
Figure 2A:
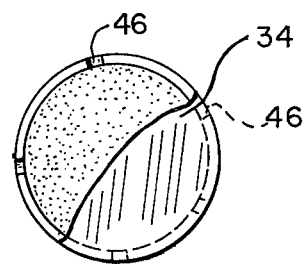
FIG. 2A is an end view partially in section of the cartridge of FIG. 2.

The opposite end portions of the interior of the canister of cartridge 22 are filled by a pair of spaced apart cylindrical shaped compressible filler means 36, 38. Compressible filler means 36, 38 may be made of any suitable compressible material. Preferably, means 36 and 38 are formed of cylindrical shaped plugs of a compressible, synthetic polymeric, foamed material such as, for example, a polyurethane or polystyrene foam. Spaced apart compressible filler means 36, 38 are seen to cooperate with the interior of the canister of cartridge 22 to define between means 36 and 38 the generally cylindrical shaped fuel charge compartment 40 which is filled with particles of a suitable solid fuel, such as, for example, particles 42 of calcium hydride. Fuel charge compartment 40 is lined by a fluid permeable liner means 44 which may comprise any suitable material which is permeable to both a liquid such as water and a gas such as hydrogen gas. Preferably, liner means 44 comprises a fibrous paper material which is absorbent of and permeable to water, and permeable to hydrogen gas. Liner means 44 lines the interior of at least that portion of circumferential wall 32 which cooperates with filler means 36, 38 to comprise fuel chamber 40.

In one preferred embodiment, as shown in FIG. 1, a pair of substantially identical cartridges 22, 22' are mounted within reaction tank 20. The cartridges contain a charge of solid fuel, for example, calcium hydride. As used in the specification and in the claims, "solid" includes a monolithic or particulate solid. Generally, particulate solids are preferred because they provide a greater surface area for contact with the fuel. Thus, "solid" includes powders or particulates and is used in a sense to distinguish from liquids and gases. Obviously, any suitable fuel or mixture of fuels which reacts with liquid to form the desired gas may be employed. For example, base metal hydrides such as alkali metal or alkaline earth metal hydrides, as well as alkali-aluminum hydrides (alanates) all react with water to form hydrogen gas. Alkali metal boro hydrides (boronates) are somewhat less reactive but may be employed to generate hydrogen gas with the use of acidified aqueous liquid or with additions of catalytically active heavy metal salts. On the other hand, some of the foregoing fuels are excessively reactive, for example, lithium alanate (LiAlH$_4$) ignites in air upon exposure to moisture. If it is desired to avoid the necessity of employing a catalyst or an acidified liquid, the boro hydrides such as, for example, sodium or potassium borohydride, are not employed alone. Generally, alkali or alkaline earth metal hydrides are preferred for generation of hydrogen by reactions with water. Other fuels may be used, in the known manner, to generate other gases such as oxygen, acetylene, carbon dioxide or chlorine. Generally, for hydrogen production, useable fuels may be selected from the group consisting of hydrides of elements of Groups I to III of the Periodic Table of the Elements and mixtures thereof. Alkaline or alkali metal hydrides, or mixtures thereof, are preferred. Other compounds, such as alkali metal-aluminum hydrides (alanates) and alkali metal borohydrides may also be employed. For example, calcium hydride is a preferred solid fuel for such use in accordance with the invention. In use, water reservoir 14 is supplied with water through water fill inlet 16. Hydrogen outlet line 30 is connected, by suitable means not illustrated, to a suitable source of demand for hydrogen, for example, to an ammonia filter and dryer thence to the hydrogen inlet manifold of a fuel cell. When it is desired to supply hydrogen to the receptacle or device for which it is required, a valve or other suitable control means (not illustrated) in line 28 is opened to supply water to reaction tank 20. As the water level rises in reaction tank 20, the water level reaches the level of fluid flow passages 46 and passes therethrough into contact with fluid permeable liner means 44. Preferably for uniform wetting of the fuel charge, the water level is raised sufficiently to completely submerge cartridges 22, 22'. As liner means 44 becomes saturated with the water, the water passes therethrough and, due in part to the absorbent and distributing effect of fluid permeable liner means 44, more or less uniformly contacts the outer surface of the mass of calcium hydride particles 42. The water reacts exothermically with the calcium hydride particles, resulting in the formation of calcium hydroxide and hydrogen gas, the hydrogen gas escaping through fluid flow passages 46. The reaction of the water with the calcium hydride fuel generates a considerable amount of heat which increases the temperature. This heat is taken up by the water in reaction tank 20. Accordingly, some moisture will comingle with the hydrogen gas generated. If necessary for a given application, known devices and techniques can be employed to remove moisture from the hydrogen stream generated.

As the reaction proceeds, the fuel charge expands in volume since the calcium hydroxide has a greater volume than the corresponding calcium hydride from which it is formed. As a result, the solid mass, now comprising a mixture of unreacted calcium hydride and reacted calcium hydroxide, expands considerably. Since the solid fuel reacts at its surface with the water, the calcium hydroxide forms a surface layer of increasing depth about the remaining interior or core mass of calcium hydride. As the hydride is reacted to the hydroxide, it expands considerably in volume. By virtue of its expansion, the hydroxide tends to be compressed within the cylinder of the vessel containing the fuel. This causes the formation of a dense, nonpermeable hydroxide layer which would tend to block or retard the penetration of additional reactant water into the interior portion of the fuel mass, thereby retarding and even halting the reaction; the construction of the present invention overcomes this problem, as described below.

Figure 3:
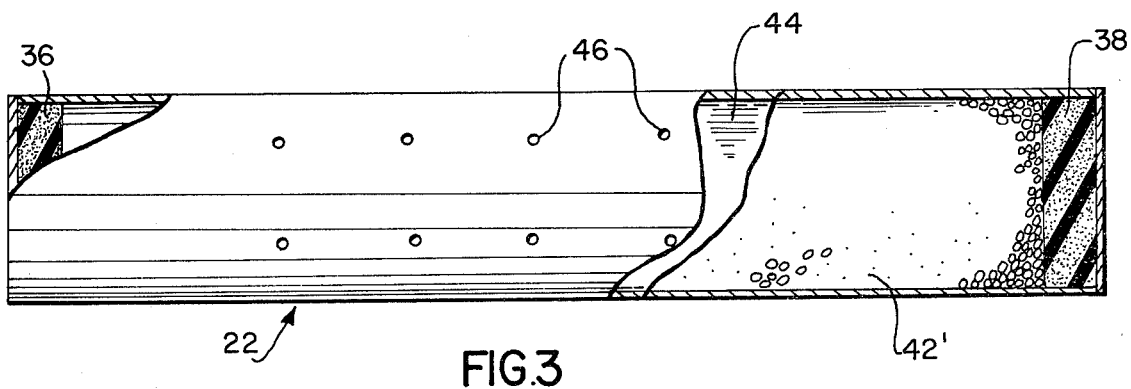
FIG. 3 is a view corresponding to that of FIG. 2 showing the cartridge after reaction of the fuel charge contained therein.

Compressible filler means 36 and 38 are compressed by the expanding mass of solid particles against end walls 34, 34' and the end portions of circumferential wall 32. As a result, the effective volume of compartment 40 is enlarged so that the density of the calcium hydroxide being formed is not increased to a level where it begins to substantially diminish the flow of reacting water through fluid flow passages 46 and through the surface portion of calcium hydroxide into the as yet unreacted calcium hydride core. As the reaction continues, the mass of material expands further within compartment 40 and compressible filler means 36, 38 are compressed against end walls 34, 34' of the respective canister of cartridges 22, 22' (or against mounting pads 26a, 26b in an embodiment where end walls 34, 34' are omitted). FIG. 3 represents the condition of the cartridge after substantially all the calcium hydride has been reacted with water. The resultant hydroxide cake 42' has expanded to an extent that compressible filler means 36, 38 are compressed to a small fraction of their original volume. In this manner, the density of the hydroxide cake forming on the outer surface of the fuel mass is maintained low enough to facilitate entry and penetration of water through the hydroxide cake into contact with the remaining fuel during reaction.

While a synthetic polymeric foamed material such as polystyrene or polyurethane foam is preferred for its light weight, cheapness and utility for the purpose illustrated, it will be apparent that any means which provides the requisite compressibility to permit the expanding fuel to be accommodated will answer for the purposes of the invention. For example, in place of a polymeric synthetic foamed material, any other compressible material may be utilized or a mechanical device such as a plate configured to slide within cartridge 22 like a piston within a cylinder and supported by compressible means such as a spring or bellows arrangement could be employed. What is required is a compressible means to cooperate with the interior of the canister comprising a part of the cartridge to form a fuel compartment of initial volume which is expandable upon expansion of the fuel charge as it reacts with the water to accommodate the increased volume of the resulting material so that the resulting material is not compacted to the extent that the flow of water into and through it sufficient to maintain the desired rate of reaction is impeded.

One example of a hydrogen generator employing a cartridge in accordance with the present invention is constructed as follows. The water reservoir 14 is comprised of an aluminum container measuring 12.5 by 28 by 3.9 (inside dimensions) centimeters having a capacity of 1.33 liters. The hydrogen generator 18 is of identical configuration and size as water reservoir 14 but is provided with a pair of oppositely disposed end pads having cartridge mounting recesses formed therein. Each cartridge is cylindrical in shape and includes a canister comprised of a relatively thin walled aluminum tube 25.5 centimeters long and 3.8 centimeters (outside dimensions) in diameter. The central portion of the tube is filled with 140 grams of calcium hydride in particulate form of a −4 mesh size. The calcium hydride fuel is preferably of at least 93% purity, containing not more than 1% nitrogen as impurity.

Compressible filler means comprising polyurethane foam cylindrical segments are placed at opposite ends of each of the tubes forming the respective canisters of the two cartridges. Compressible filler means 36, 38 have a diameter substantially equal to the inside diameter of the tube or canister of cartridge 22 and each is about 4 centimeters in length, so that the length of the fuel compartment formed between them is approximately 11 centimeters prior to any compression of filler means 36, 38 by the expanding fuel residue. The fuel compartment is lined with a fiber paper 44 which is permeable to hydrogen gas and to water. Paper 44 serves to aid in distributing water equally around the circumferential surface of the fuel charge.

A series of twenty-four perforations 46 are provided in the aluminum wall of the tube of cartridge 20, these perforations each being radially extending holes through the aluminum wall of about 0.1 centimeter in diameter. The perforations are equally circumferentially spaced about the cartridge, each perforation being circumferentially spaced about 2 centimeters from the next adjacent perforation and being spaced about 2 centimeters apart along the central portion of the length of the cartridge. The perforated central portion of the cartridge extends for about 10 centimeters.

In operation, water is metered into reaction tank 20 and contacts the metal hydride charge, say calcium hydride, thereby generating hydrogen gas and leaving an expanding residue of calcium hydroxide. Hydrogen gas passes from the cartridges into reaction tank 20 thence through outlet line 30. As the reaction proceeds, the compressible filler means 36, 38 are each compressed against the respective ends of the tubes of cartridges 22 as the fuel residue expands.

While the invention has been described with specific reference to a particular preferred embodiment thereof, it will become apparent to those skilled in the art that numerous alterations and modifications thereto are possible which are nonetheless within the spirit and scope of the invention. For example, while it may be convenient for shipping and handling to provide the cartridges with end walls as described above, it is also apparent that the the canisters of cartridges may comprise segments of aluminum tubing (or other suitable material) open at each end since the ends of the mounting end pads would serve to maintain the compressible end means in place within the end of the tubes. In such case, the space within the open-ended tube defines the enclosed space within which the compressible filler means is disposed. For shipment and handling the ends of the tube segments may be provided with temporary caps such as a snap on type of plastic cap. Generally, a relatively thin wall, compared to the volume of the cartridge, type of construction is preferred and for economy the suitable and preferred material of construction is aluminum tubing. However, it will be apparent that any other suitable material may be employed.

What is claimed is:

1. A cartridge for a gas generator comprising:
   a canister having an interior defining an enclosed space;
   compressible filler means disposed within said enclosed space and cooperating with said interior of said canister to define a fuel charge compartment, said canister having fluid flow passages formed therein connecting said fuel charge compartment in fluid flow communication to exteriorly of said canister, and
   a solid fuel charge disposed within said fuel charge compartment, said fuel being one which, upon contact with a suitable liquid, releases a gas and expands in volume to compress said filler means and thereby enlarge said fuel charge compartment.

2. The cartridge of claim 1 further including fluid permeable liner means lining said fuel charge compartment and overlying said fluid flow passages.

3. The cartridge of claim 2 wherein said liner means is a water and gas permeable fiber material and said filler means is a synthetic polymeric foamed material.

4. The cartridge of claim 1 or claim 2 wherein said fuel is selected from the class consisting of hydrides and borohydrides of alkali metals, hydrides and borohydrides of alkaline earth metals, alkali metal-aluminum hydrides, and mixtures thereof.

5. The cartridge of claim 1 or claim 2 wherein said solid fuel is selected from the class consisting of borohydrides and hydrides of elements of Groups I to III of the Periodic Table of the Elements and mixtures thereof.

6. The cartridge of claim 1 wherein said interior of said canister is defined by an elongate intermediate portion closed at its opposite ends, whereby said enclosed space extends longitudinally and said compressible filler means is disposed to occupy at least one longitudinally extending segment of said enclosed space whereby said enclosed space unoccupied by said filler comprises said fuel charge compartment.

7. The cartridge of claim 6 further including fluid permeable liner means lining said fuel charge compartment.

8. The cartridge of claim 7 including two of said compressible filler means spaced apart from each other to define said fuel charge compartment therebetween.

9. The cartridge of claim 8 wherein said fluid passage means comprises a plurality of holes in that part of said intermediate portion which cooperates with said filler means to define said fuel charge compartment.

10. A cartridge for a gas generator comprising:
    a canister having an interior defining an enclosed space and a plurality of fluid flow passages in said canister;
    compressible filler means disposed within said enclosed space and cooperating with said interior of said canister to define a fuel charge compartment;
    a solid fuel charge disposed within said fuel charge compartment, said fuel charge being one which, upon contact with a suitable liquid, releases a gas and expands in volume to compress said filler means within said canister and thereby enlarge said fuel charge compartment; and
    fluid permeable liner means lining said fuel charge compartment and overlying the interior ends of said fluid flow passages, said interior ends of said fluid flow passages being disposed within said fuel charge compartment and said fluid flow passages thereby connecting said fuel charge compartment, through said liner means, in fluid flow communication to exteriorly of said canister.

11. The cartridge of claim 10 including two of said compressible filler means spaced apart from each other to define said fuel charge compartment therebetween.

12. The cartridge of claim 11 wherein said compressible filler means made of a synthetic polymeric foamed material.

13. The cartridge of claim 12 wherein said canister is of substantially tubular configuration.

14. The cartridge of claim 12 wherein said fuel is selected from the class consisting of hydrides and borohydrides of alkali metals, hydrides or borohydrides of alkaline earth metals, alkali metal-aluminum hydrides, and mixtures thereof.

15. The cartridge of claim 14 wherein said fuel is an alkaline earth metal hydride.

* * * * *